INVENTORS
BERNARD T. HENSGEN
HOWARD G. REICHEL
BY R. L. Story
ATTORNEY

INVENTORS
BERNARD T. HENSGEN
HOWARD G. REICHEL
BY R. D. Story
ATTORNEY.

Aug. 21, 1956  B. T. HENSGEN ET AL  2,759,434
MOLDING METHOD AND APPARATUS
Filed Aug. 7, 1953  7 Sheets-Sheet 6

INVENTORS
BERNARD T. HENSGEN
HOWARD G. REICHEL
BY R. L. Story
ATTORNEY

INVENTORS
BERNARD T. HENSGEN
HOWARD G. REICHEL
BY
ATTORNEY

United States Patent Office 2,759,434
Patented Aug. 21, 1956

2,759,434

MOLDING METHOD AND APPARATUS

Bernard T. Hensgen and Howard G. Reichel, Chicago, Ill., assignors to Swift & Company, Chicago, Ill., a corporation of Illinois Application August 7, 1953, Serial No. 373,024

25 Claims. (Cl. 107—8)

The present invention relates to a method and apparatus for molding a frozen product.

Many products that are sold today in a frozen or a semi-frozen form are divided into serving portions after a substantial quantity of the product has been solidified by chilling. For example, the general practice today in serving ice cream is to freeze the ice cream in large containers from which the ice cream is dipped with a scoop which measures and forms the individual serving of ice cream. In the case of ice cream this process has a number of disadvantages. The dipping of the ice cream by a scoop compresses the product to change its consistency producing a noticeable reduction in volume. Thus, the stores, restaurants etc., that dip ice cream actually serve a smaller volume of ice cream than there is in the container of product that they purchase. Also in the case of ice cream the process of dipping involves a substantial item of labor cost over what would be the case should the person doing the dispensing only have to take a preformed, measured, quantity of product and serve it.

Other products are frozen in a block form from which individual portions are cut by means of a saw or knife. One example of a product formed in this manner is meat patties. Over a period of time such a procedure often involves a measurable loss of product which is displaced from the plane along which the cut is made, along with other costs that increase the price that must be charged for the product.

The principal object of the present invention is to provide a method and apparatus for automatically and continuously forming a large number of units of product solidified by chilling. While it is contemplated that these units would each be individual servings, it will be apparent that it also might be used in conjunction with subsequent operations in which the individual units are subdivided. One particular advantage of the instant invention is that the individual units are removed from the machine in aligned groups suitable for immediate packing as a group.

One of the problems that is always encountered in a machine of this type is the problem of easy removal of the chilled product from the mold. In the case of most products the process of chilling tends to produce an adhesion between the solidified product and the walls of the mold making it difficult to remove the product from the mold. One expedient that has been used at times in the past is to warm the mold after the product has solidified to break this adhesion by liquefying the portion of product immediately adjacent the walls of the mold. Such a process is uneconomical because it involves the adding of heat which is an item of expense and the necessity for the subsequent removal of that heat which is a further item of expense. Thus, a second object of the present invention is to provide a method and apparatus for removing the solidified product from the mold without necessitating the application of heat to the mold. Several novel factors are utilized with each contributing to the ease of removal. For example, the frosting of the mold, the twisting of the product to aid in breaking the adhesion between the product and the mold, and the temperatures utilized in freezing the product. However, improved results can be obtained without necessarily using all of these factors together.

A further object of the invention is to avoid the existence of voids within the molded product. This is accomplished by a novel method and apparatus for filling the molds. Furthermore, the molds are filled with a measured quantity of product so that each unit is an identical amount and there is no wastage resulting from overflowing or spilling, etc.

Another object of the invention is to provide an apparatus wherein the refrigeration may be readily accomplished without extensive sealing problems attendant upon the use of conventional refrigeration equipment. This is accomplished by the use of low pressure refrigeration.

Other objects and advantages will become apparent from the following description taken in conjunction with the drawings in which.

*Freezing head*

Figure 2:
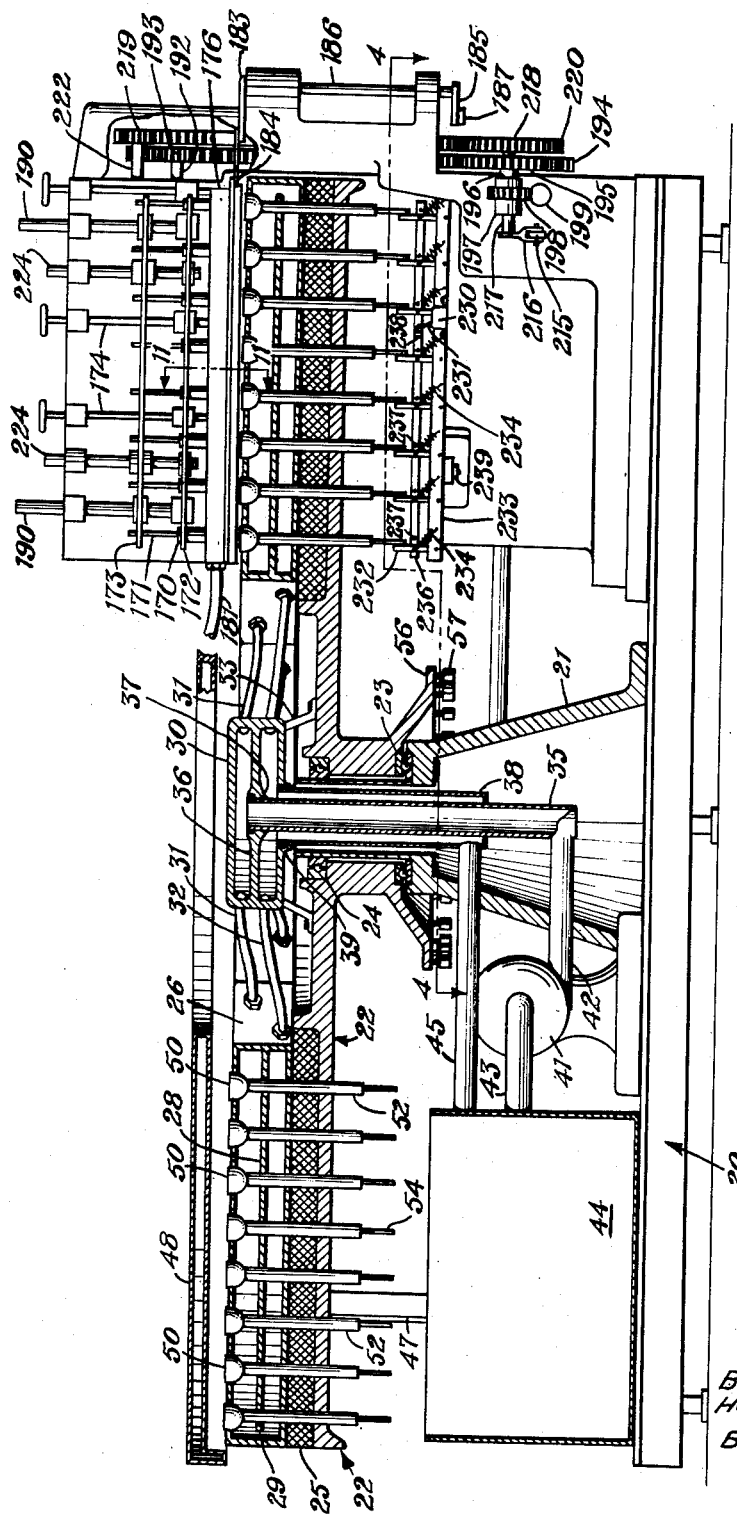
Figure 2 is a section taken at line 2—2 of Figure 1.
Figure 3:
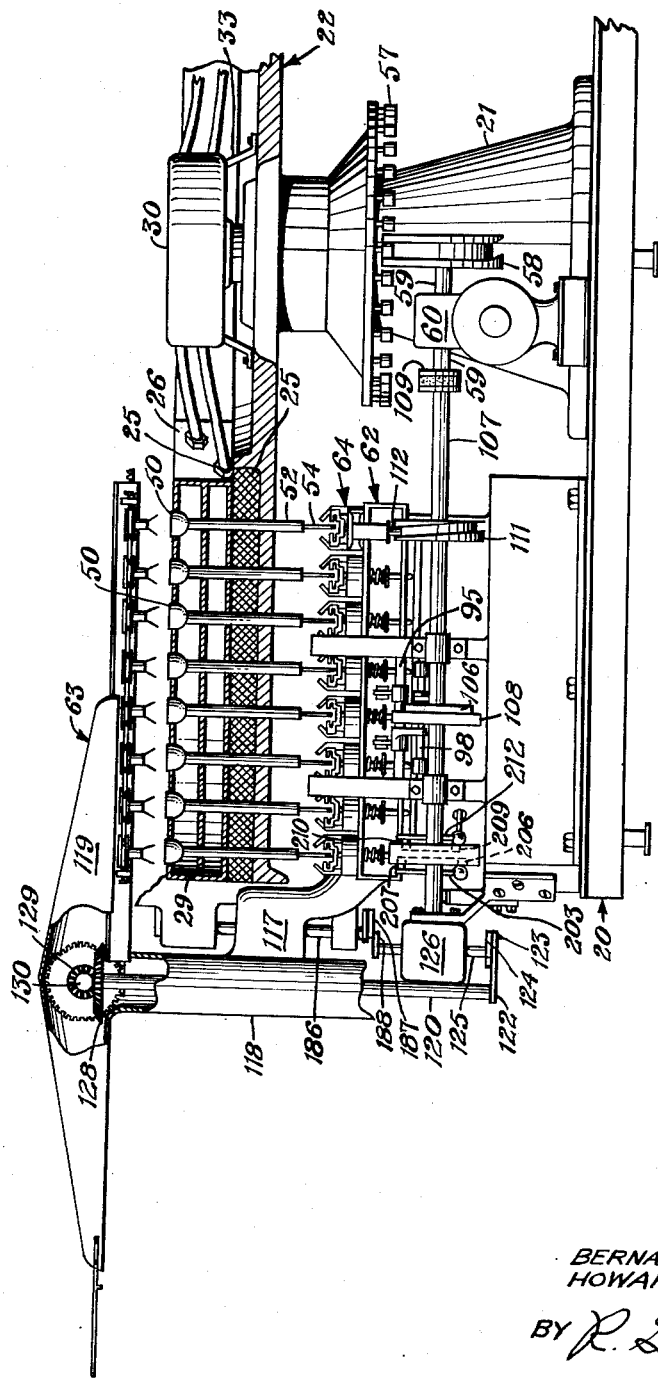
Figure 3 is a section taken at line 3—3 of Figure 1.

The embodiment illustrated in Figures 1–14 was devised for preparing servings of ice cream having a general configuration similar to that of the conventional "scoops" of that product. The device comprises a frame generally 20 having a center pillar 21. Pillar 21 supports a circular table generally 22 carried on bearings 23 and 24. About the outside of the table is a layer of insulating material 25 on which are mounted the coolant chambers 26. The general form of the coolant chambers is that of a segment of a circle with a plurality of the coolant chambers being mounted about the table. As is best seen in Figures 2 and 3, a baffle 28 divides the coolant chambers in half. Baffle 28 does not extend entirely across the coolant chamber, but a gap 29 is left at the outer rim so that the coolant can flow from one chamber to the other.

Each of the upper halves of the chambers 26 communicates with the upper portion of a drum 30 by means of a pipe 31, while the lower halves of the coolant chambers 26 communicate with the lower half of the drum 30 through a pipe 32. Drum 30 is secured to table 22 by means of legs 33. A pipe 35 positioned concentric with the axis of the table 22 is connected to the upper chamber of drum 30 with the pipe being in a fixed position while the drum 30 rotates as the table 22 rotates as hereinafter explained. The joint between the pipe 35 and the dividing member 36 of drum 30 is maintained fluid-tight by a packing gland 37. An outer concentric pipe 38 is mounted in the bottom wall of drum 30 with provision being made for rotation of the drum 30, with respect to pipe 38, by a packing gland 39. Pipe 35 connects to the discharge opening of a circulating pump 41 by means of a pipe 42. The intake of pump 41 connects through a pipe 43 to a coolant tank 44. Pipe 38 connects to coolant tank 44 through a pipe 45.

The coolant tank is filled with a suitable refrigerant such as oleum spirits. Solid carbon dioxide may be used in tank 44 to cool the oleum spirits or the cooling coils of a suitable mechanical refrigeration system (not shown) may be inserted therein in contact with the oleum spirits. Such a mechanical refrigeration system is well-known in the art as shown in the book Refrigeration by Moyer and Fitz, McGraw-Hill Book Company, Inc., 1932, and forms no part of the present invention. Supported above a portion of the table by means of legs 47 is an upper coolant chamber 48 which is also connected to a suitable source of refrigeration, such as was mentioned, through connecting pipes (not shown). Since only low pressures are used in the coolant circulated by pump 41, the construction and maintenance problems are greatly simplified.

Figure 11:
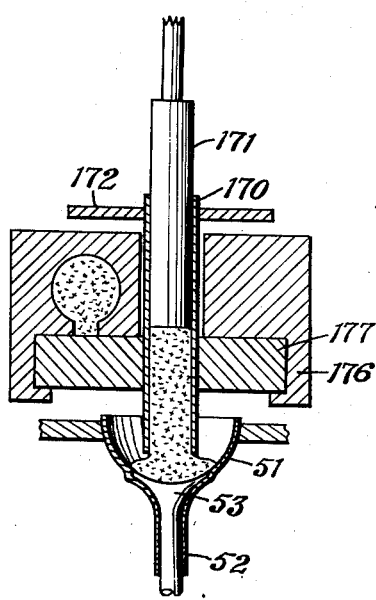
Figure 11 is an enlarged section taken at line 11—11 of Figure 2 showing the dispensing of product into the molds.

Extending down from the upper surface of the coolant chambers 26 are a plurality of molds 50 the structure of which is best seen in Figure 11. The inner configuration of the molds is that of a figure of revolution. The mold comprises an upper cup 51 from which a tube 52 projects downwardly. As seen in Figures 2 and 3 the tube 52 extends to below the lower surface of table 22. The upper surface of a plunger 53 forms the bottom of the mold 50 with the rod 54 of the plunger 53 projecting below the bottom end of tubes 52.

Integral with the bottom portion of table 22 is a skirt 56 having a plurality of cam followers 57 extending downwardly therefrom. Cam followers 57 are sequentially engaged by a cam 58 (see Figures 3 and 4) secured to one end of the output shaft 59 of a motor driven speed reducer 60.

*Ejection and transfer mechanism*

The general organization of the ejection and transfer mechanism is shown in Figure 3 where it will be seen that the ejection mechanism generally 62 is positioned below table 22 while the transfer mechanism generally 63 is above the table. The ejection mechanism 62 comprises a plurality of grippers generally 64 which grasp the rods 54 of the plungers of the molds 50 and push up on the plungers while at the same time rotating the plungers. This combination of a vertical force in conjunction with a rotary force is very effective in braking any adhesion that may exist between the product and the mold.

Figure 5:
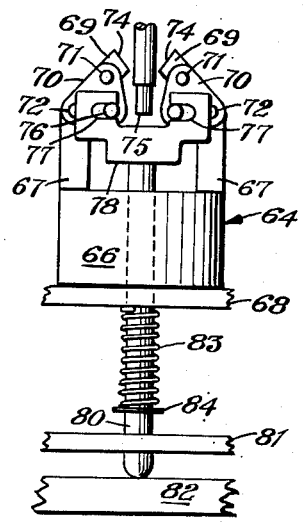
Figure 5 is an enlarged elevational view of one of the ejection stem grippers with the gripper open.
Figure 6:
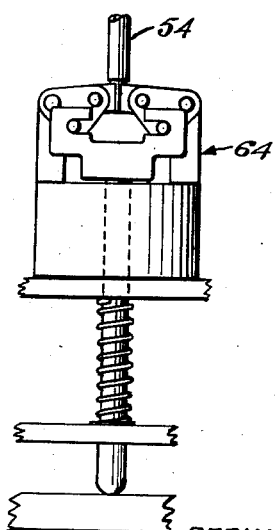
Figure 6 is a view corresponding to that of Figure 5 with the gripper closed.
Figure 7:
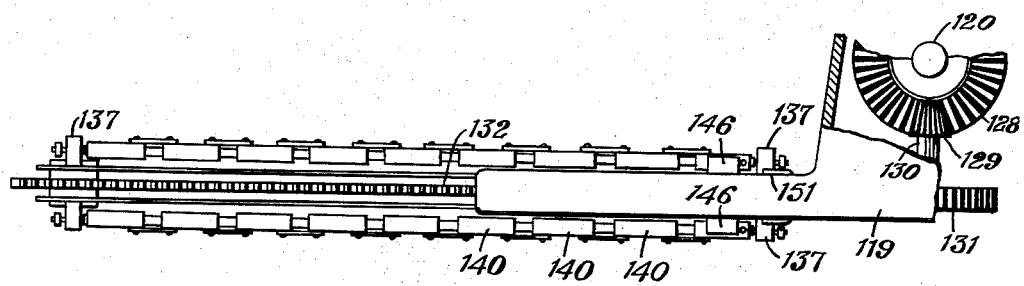
Figure 7 is a plan view of the portion of the product transfer head extending over the freezing table.
Figure 8:
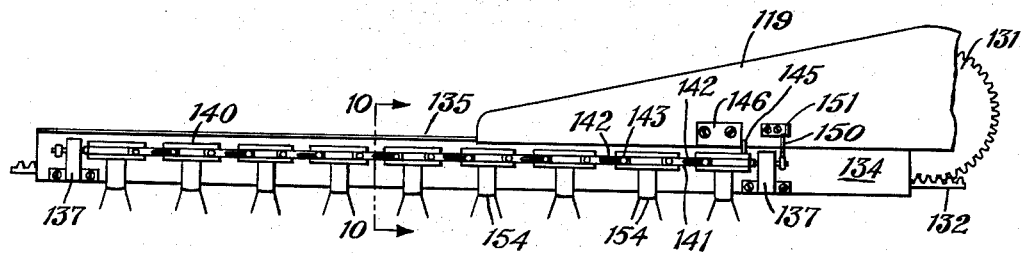
Figure 8 is a side elevation of the portion of the product transfer head shown in Figure 7.
Figure 14:
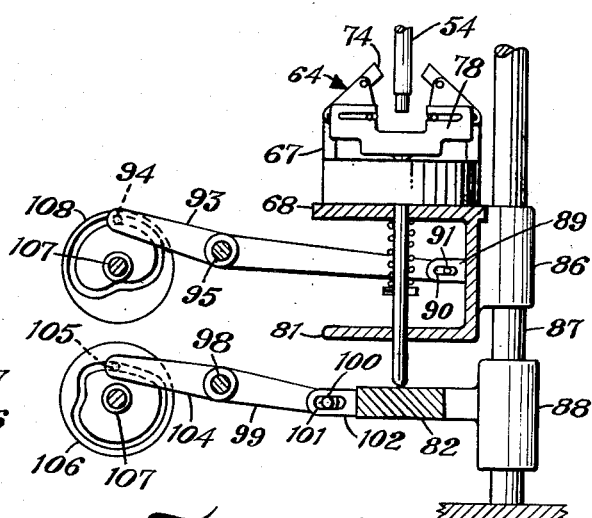
Figure 14 is a diagrammatic representation of the mechanism for actuating the ejection stem gripping mechanism of Figures 5 and 6.

The structure of the grippers is best seen in Figures 5, 6, and 14. Each of the grippers comprises a barrel 66 which has a pair of posts 67 projecting upwardly therefrom. Barrels 66 are rotatably supported on a plate 68. Attached to the upper end of posts 67 are a pair of arms 69 to which a link 70 is secured by means of pins 71 and 72. Pin 72 severes as a pivotal attachment between the arms 69, the links 70 and the post 67. The outer ends 74 of arms 69 are curved to fit about the reduced end 75 of rods 54 so that when the arms are pulled down against the shank end 75, as shown in Figure 6, it is securely gripped between the arms. The top of end 75 forms an abutment against which the arms 69 and exert an upward force on the plungers.

Links 70 also have a pin 76 projecting therefrom. The upper ends of the pins 76 are received within slots 77 of bracket 78. A rod 80 is journaled in plates 68 and 81 with the lower end of the rod bearing against bar 82. The upper end of rod 80 is attached to bracket 78. A spring 83 encircles rod 80 with one end of the spring bearing against plate 68 while the other end bears against a lock washer 84 secured in a circumferential slot in rod 80.

As is seen in Figures 3 and 14, plates 68 and 81 are connected together and are guided in a vertical movement by a sleeve 86 mounted on a post 87. Bar 82 is attached to a similar sleeve 88 also mounted on post 87. A pair of arms 89 secured to plates 68 and 81 have a slot 90 within which is received a pin 91. Pin 91 is attached to one end of a rocker arm 93 with a cam follower 94 being attached to the other end of the rocker arm. Rocker arm 93 is secured to a shaft 95, which shaft is pivotally mounted in the frame 20. As will be seen in Figure 4, a second half rocker arm 96 is also secured to shaft 95 and is connected to a second pair of arms 89 through a pin 91.

A second rocker shaft 98, pivotally mounted in frame 20, has a pair of arms 99 secured thereto, the ends of which arms have a pin 100 received in slots 101 of arms 102 affixed to bars 82. Rocker shaft 98 also has a third arm 104 attached to the shaft. At the end of arm 104 is a cam follower 105.

Cam follower 105 rides on the periphery of a cam 106 secured to a shaft 107. Cam follower 94 is received in a box cam 108 also secured to shaft 107. Shaft 107 is attached to the output shaft 59 of the motor driven speed reducer 60 by means of a coupling 109.

Also attached to shaft 107 is a cam 111 (see Figures 3 and 4) which moves a cam follower 112 secured to the end of an arm 113. Arm 113 is attached to the forward side of one of barrels 66. At the rear of each of barrels 66 is a projecting lug 114 each of which is attached by a pin to a connecting member 115.

The transfer head 63 is supported from the main frame 20 by a bracket 117 and includes a cylindrical casing 118 having a crosspiece 119 at the top thereof in the form of a T (see Figure 3). Within the cylinder 118 and mounted in suitable bearings (not shown) is a shaft 120. The lower end of the shaft 120 has an arm 122 projecting therefrom which arm has a longitudinal slot therein. Within the slot in arm 122 is received a pin 123 projecting downwardly from a crank 124 on the end of a shaft 125. Shaft 125 extends through a gear box 126 within which there are a pair of engaged, bevel gears one of which is secured to shaft 125 and the other of which is secured to shaft 107 so that the two shafts rotate in unison.

At the upper end of the vertical shaft 120 is a bevel gear 128 which meshes with a second bevel gear 129 on a cross shaft 130. At the other end of shaft 130 is a gear 131 which engages a rack 132. As will be seen in Figure 10, rack 132 is attached to and forms a part of a deep channel 134. Channel 134 has a pair of flanges 135 at the upper end thereof, which flanges slide in ways 136 of crosspiece 119.

Figure 9:
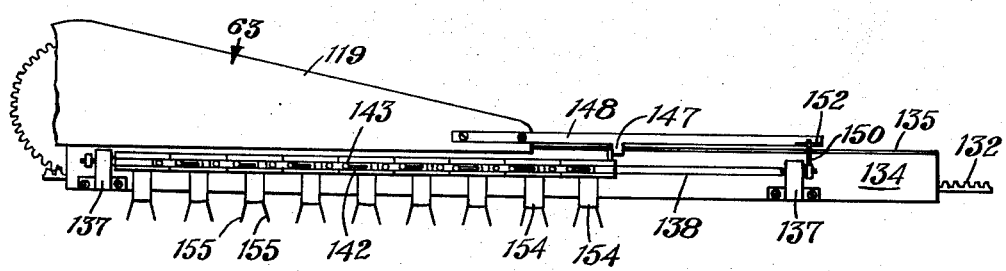
Figure 9 is a side elevation of the portion of the product transfer head extending beyond the table illustrating the manner in which the apparatus is used to remove the product for insertion into suitable packing containers.
Figure 10:
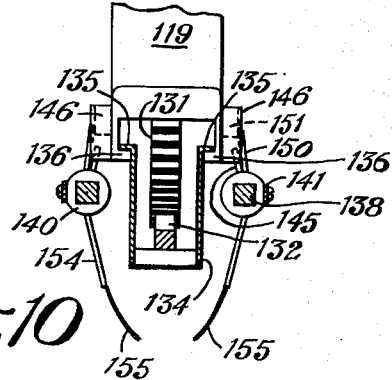
Figure 10 is a section taken at line 10—10 of Figure 8.

On each side of channel 134 are a pair of bearings 137 with each pair of bearings supporting a bar 138 which bar is rectangular in cross-section except for the ends thereof that are mounted in the bearings 137. A plurality of rectangular blocks 140 are slidably mounted on each of bars 138. The number of blocks on each side of the channel 134 corresponds to the number of molds 50 in a radial row on the table. The blocks 140 are each secured to the adjacent blocks by connecting links 141 with one end of the links being slotted at 142 so that the link will move back and forth over the pin 143 attached to the respective block. The outer end block (to the right in Figures 7 and 8) on each side has a pin 145 projecting therefrom, which pin engages a stop 146 at one end of the travel of the channels and engages a stop 147 attached to arm 148 at the other end of the travel. Arm 148 is screwed to crosspiece 119 as seen in Figure 9. The inner end blocks (to the left in Figures 7 and 8) are attached to bars 138.

A positioning arm 150 is attached to one end of bar 138. At one end of the path of travel of the channel 134 the positioning arm 150 contacts a block 151 secured to the side of casing 118 (see Figures 7 and 8) so that the block serves as a cam to turn the arms and consequently turn the bar 138. At the other end of the path of travel (see Figure 9) the positioning arm 150 intersects a cam 152 on the end of arm 148 to turn the positioning arm 150 and the bar 138 in the opposite direction.

To the bottom of each of blocks 140 is secured a depending metal strip 154. In turn the metal strips 154 have a pair of wire fingers 155 extending downwardly therefrom. The metal strips and wires form the pick-up fingers for removing the frozen product.

Frosting of molds

Figure 1:
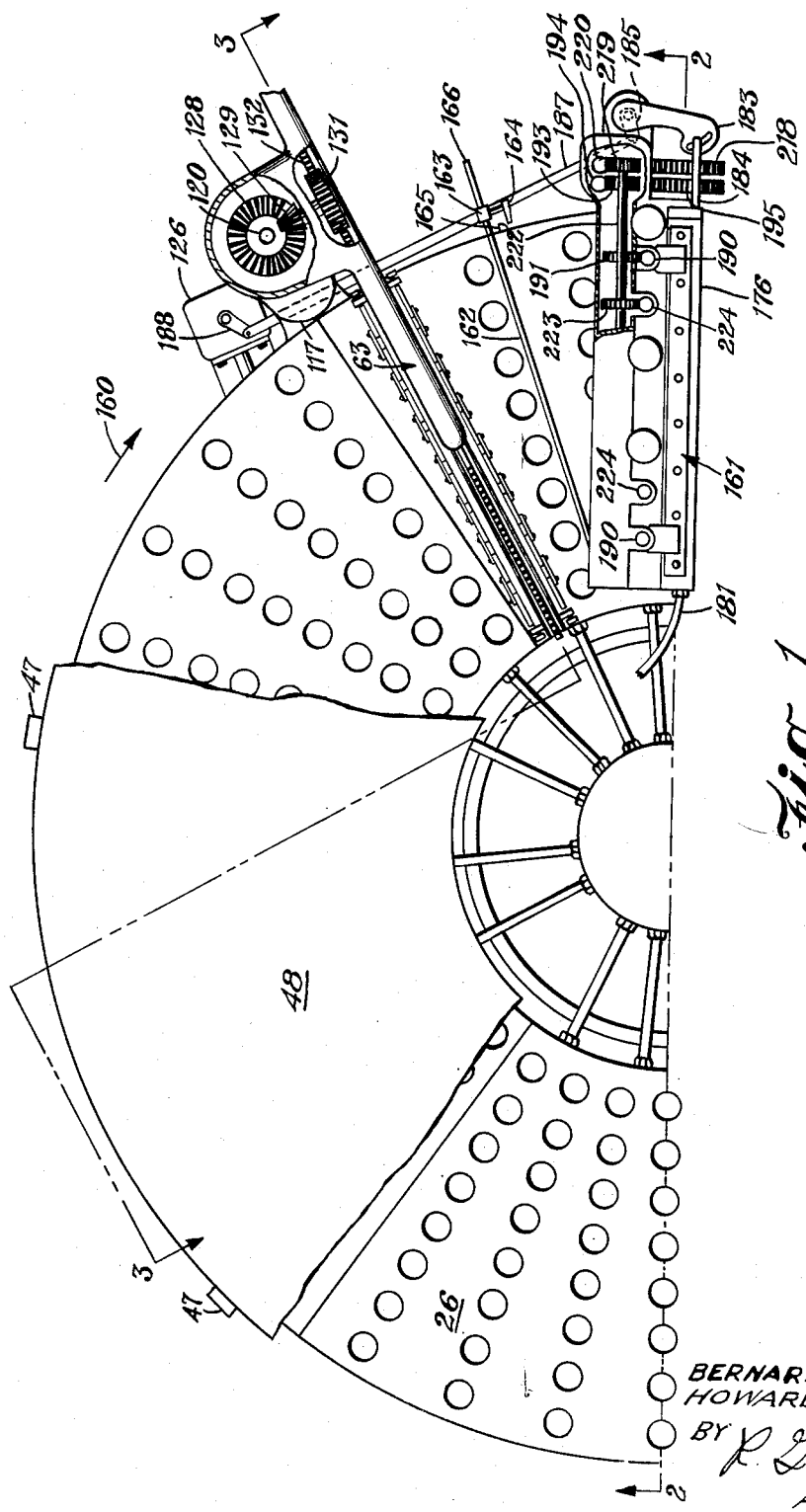
Figure 1 is a plan view of one half of the machine with portions thereof broken away.

Referring to Figure 1, the table 22 is rotated in the direction indicated by arrow 160. The molds, having been emptied at the position represented by the transfer head 63, are frosted before reaching the filling head generally 161. This is done by blowing vapor-laden air into the cold molds from a plurality of spray heads projecting downwardly from pipe 162. Pipe 162 is connected to a valve 163 which has a lever 164 to move the stem of the valve and open the valve. The lever is spring-loaded to maintain the valve normally closed. Lever 164 is positioned in the path of a plurality of cams 165 on the periphery of table 22 so that as the cams 165 move past the valve, the valve will be opened briefly to permit a blast of liquid-laden air to be blown through pipe 162 and the spray connected thereto from a pipe 166 leading to a suitable source of supply. In some embodiments it may be desirable to use steam rather than air.

Filling mechanism

The portion to be inserted in each mold is measured by a pump with a separate pump being used for each mold in the line. Each pump is made up of a sleeve 170 which forms the cylinder and a piston 171 (see Figure 11). Each of the sleeves are secured to a common cross bar 172 and each of the pistons similarly are secured to a cross bar 173 (see Figure 2). The two cross bars are each slidably mounted on vertical rods 174 for vertical movement independent of each other. As will be seen in Figure 11 each of the sleeves is positioned in a common guide 176 which is fixed to the frame 20. In the bottom portion of the guide 176 is a slide valve 177. For each of the pumps the slide valve 177 has an opening 178 (see Figure 12) through which the sleeve 170 may pass, and adjacent thereto the slide valve also has a passage 179 (see Figure 13) which communicates with the sleeve 170 and also with a longitudinal passage 180 extending the length of the guide 176. At the end of guide 176 passage 180 connects to a supply pipe 181 (see Figure 2).

The slide valve 177 is moved longitudinally by means of a crank 183 and connecting rod 184 (see Figures 1 and 2) so as to place either opening 178 or passage 179 under sleeve 170. Crank 183 together with a second crank 185 are attached to a shaft 186 journaled in the frame 20. The second crank 185 is secured to a connecting rod 187, the other end of which is attached to a crank 188 on the top end of shaft 125 (Figure 3).

A pair of racks 190 are secured to cross bar 173 that holds pistons 171. Each of racks 190 is engaged by one of a pair of gears 191 pinned to shaft 192 (Figure 1). Shaft 192 is suitably journaled in frame 20 and at its outer end a third gear 193 is attached to the shaft. In turn, gear 193 engages a vertical rack 194 the lower end of which is engaged by a gear 195 on sleeve 196. Sleeve 196 is suitably journaled in bearings 197. Attached to sleeve 196 is a gear 198 which engages a rack 199. Rack 199 is attached to a connecting rod 202, the other end of which is attached to the downwardly extending arm 203 of a double crank (Figure 3). The crank of which 203 is an arm is journaled on shaft 204, shown in Figure 4, which shaft hides arm 203 in that view. The other arm 205 of the crank extends to the side of box cam 206 and has a cam follower 207 that engages cam 206.

The other side of the body that forms box cam 206 also has a second box cam 209 therein which is engaged by cam follower 210. An arm 211 of a crank journaled on shaft 204 is attached to the cam follower 210 while the second arm 212 of the crank extends downwardly and is attached to a connecting rod 213. The other end of connecting rod 213 is secured to a slide 215 which is connected to a yoke 216 mounted on a shaft 217. Shaft 217 extends through and is journaled in sleeve 196 with the other end of the shaft having a gear 218 mounted thereon. Gear 218 as well as a gear 219 engage a rack 220. Gear 219 is attached to a shaft 222 suitably journaled in frame 20. Two other gears 223 are also attached to shaft 222 and mesh with a pair of racks 224 which are attached to cross bar 172.

Figure 4:
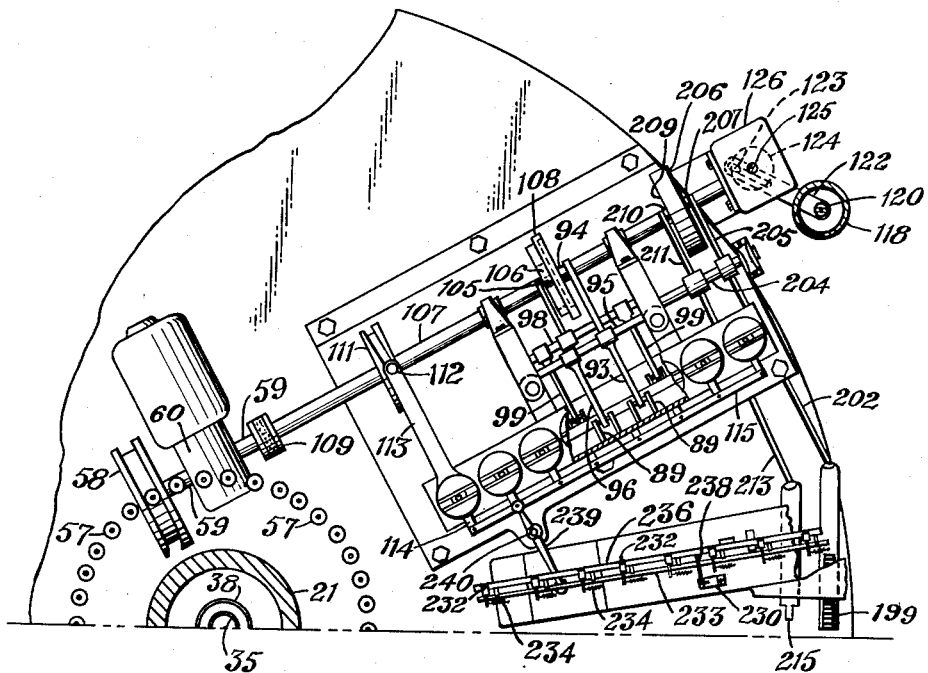
Figure 4 is a section taken at line 4—4 of Figure 2.

Because of the cold temperatures involved, there is a possibility that the push rods 54 of the molds 50 may stick in the raised position upon the ejection of product from the molds. If this should occur there is a possibility of damage to the pumps during the filling of the molds inasmuch as the sleeves 170 project into the molds during the filling as shown in Figure 11. To prevent any damage the gear motor 60 is connected through a normally closed switch 230 (see Figures 2 and 4) having a switch actuating lever 231. Alongside the switch 230 a plurality of fingers 232 are pivotally secured to a bar 233. The fingers are normally held in a vertical position by springs 234. At one side of the fingers 232 is a second bar 236 having a plurality of pins 237 projecting out from the bar into line with the fingers 232. Thus, there is a set of pins 237 and fingers 232 for each of the molds in a radial row. Bar 236 also has a bracket 238 extending out against switch lever 231. Referring to Figure 4, bar 233 is connected to a lever 239 pivotally attached to frame 20 by means of a pin 240. The other end of lever 239 is secured to connecting member 115 so that as connecting member 115 moves back and forth the lever 239 will also move back and forth.

Operation

Before commencing operation the refrigeration is supplied for a sufficient length of time to bring the temperature of the molds 50 to the desired range for operation. Preferably this temperature is below about minus 25 degrees Fahrenheit as we have discovered that there is less adhesion to the molds in this range. Normally, we operate at temperatures of about minus 40 degrees Fahrenheit. Sufficient refrigeration capacity should be provided to maintain the particular temperatures used.

Figures 12, 13:
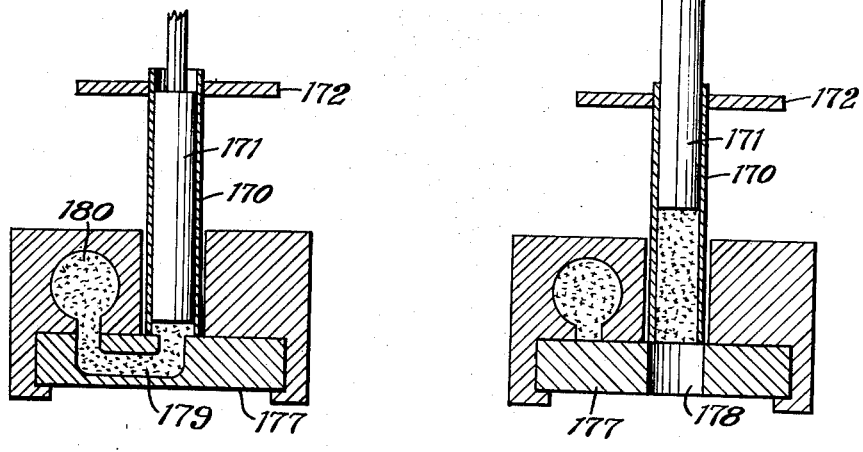
Figure 12 is an alternate view of the dispensing structure of Figure 11 showing the dispensing structure just prior to the filling of the mold.
Figure 13 is an alternate view of the dispensing structure of Figure 11 showing the filling of the dispensing pump.

The drive of table 22 provided by the cam 58 and the cam followers 57 will be a step by step movement with a dwell period in between each forward step. Each one of the cam followers 57 corresponds to a radial row of cups 50. Before a row of cups are filled the slide valve 177 is positioned as shown in Figure 13. Piston 171 is raised by the upward movement of bar 173 to draw product through passage 179 from passage 180. The slide is then moved to the position shown in Figure 12 and both the piston 171 and the sleeve 170 are lowered through opening 178 in slide valve 177 into approximately the position shown in Figure 11. This positions the pump so that the first material discharged is deposited immediately in the bottom of the mold 50. From the position shown in Figure 11 the sleeve 170 is gradually raised and at the same time piston 171 is gradually lowered. This pushes the material out of the pump into the mold and at the same time the material is discharged from the pump at approximately the level of the previously discharged material so that it flows evenly out across the surface of the already discharged material. This has been found to be an important factor in the elimination of voids in the frozen product. Subsequently both the sleeve 170 and the piston 171 are raised sufficiently so that the slide valve 177 can be moved to reposition passage 179 below the pump.

After one row of cups have been filled, the table 22 indexes with another row of cups being positioned below the filling head 161. With each indexing of the table the filled cups move toward the ejection mechanism 62 and the transfer head 63. As the cups reach the ejection and transfer station the grippers 64 are held open by bar 82 being raised as shown in Figure 5. After the filled cups have indexed into position above the ejection mechanism 62, bar 82 is lowered with spring 83 closing the gripping arm 69 about the end 75 of rods 54 (Figure 6). Cam 111 (Figure 4) then moves arm 113 to rotate grippers 64. At the same time box cam 108 raises plates 68 and 81 to push upwardly on stem 54. The combination of these two movements breaks any adhesion between the product and the molds 50 and the plungers 53 push the product up out of the cups.

In the meantime the grippers of the transfer head have been moved from the position beyond the table (the left end in Figure 3) to over the table. As this movement occurs the blocks 140 are pulled from the inside end (the left in Figures 7 and 8) by reason of the end block on the left being attached to the bar 138. If the inward movement of the channel 134 is not sufficient to pull the blocks 140 completely apart, the contact of pin 145 with stop 146 will draw the blocks into the fully extended position shown in Figures 7 and 8. At the same time arm 150 rides up on block 151 to push the arm outwardly and rotate the pick-up fingers inwardly (Figure 10), whereupon the pick-up fingers grasp the molded product that has been pushed up out of the molds by the plungers 53. The plungers then lower as a result of the further movement of box cam 108 to leave the product hanging on the inwardly turned fingers.

Channel 134 is moved outwardly in the crosspiece 119. This movement will tend to push the blocks 140 back together, but if they are not completely together as a result of the movement, they will be when pin 145 contacts stop 147. The individual pieces of product are then spaced immediately adjacent each other in a regular row for packing in a suitable container (not shown) which is placed under the fingers when they are in the position shown in Figure 9. At this time arms 150 contact cam 152 to rotate the arms 150 inwardly and, consequently, rotate the fingers that are holding the product outwardly to release the product to be dropped into position in the packaging container.

Before the next step of rotation of table 22, bar 82 raises rod 80 to open the gripping fingers and release the stem 54. During the subsequent indexing steps, before the line of empty molds moves from the transfer head 63 to the filling head 161, the molds pass the spray heads associated with pipe 162 and a spray of moist air is blown into the molds providing a coating of frost on the molds.

As the empty molds reach the filling head 161, but before the molds are filled, bar 233 to which the fingers 232 are attached is moved to the right in Figures 2 and 4 by the movement provided by cam 111. In moving to the right if each of fingers 232 contacts a rod 54 of the mold, the finger is pivoted back against the tension of springs 234 and the operation proceeds as usual. However, if any one of the rods 54 has not lowered into position, the associated finger 232 does not pivot back as it would should it strike a rod 54 and as a consequence the movement of bar 233 to the right brings that finger into contact with the associated pin 237 of the bar 236. The contact between the finger 232 and the pin 237 coupled with the movement of the fingers to the right moves bar 236 to the right pushing bracket 238 against switch lever 231 to change the position of the switch and stop the gear motor 60. After the operator has made the necessary replacement of the position of the mold plunger 53, the machine may be restarted.

*Modifications*

Figure 17:
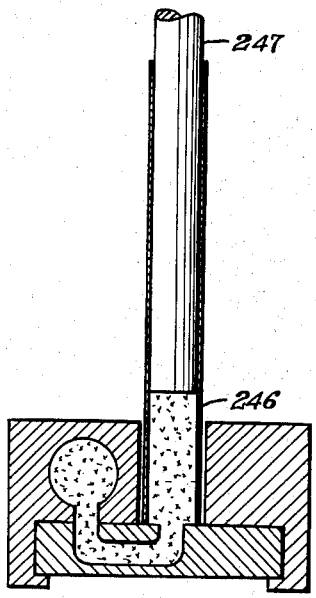
Figure 17 is another showing of the dispensing structure of Figure 15 in an alternate position.
Figure 16:
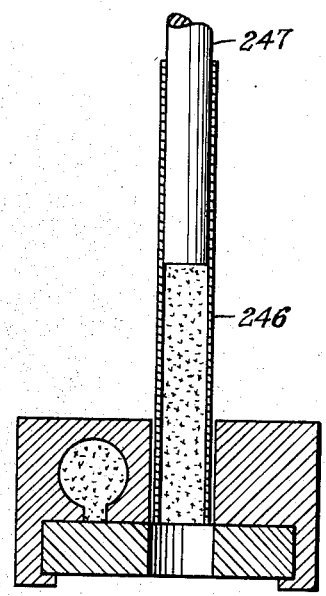
Figure 16 is a showing of the dispensing structure of Figure 15 in an alternate position.
Figure 15:
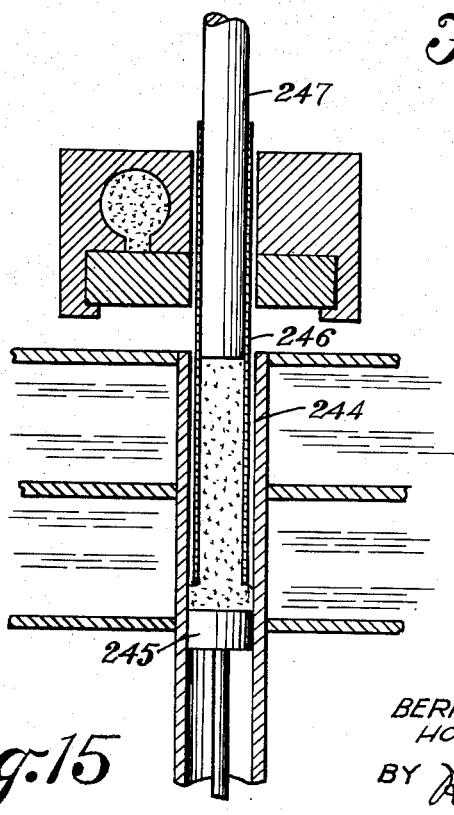
Figure 15 is a section taken at the same line as Figure 11 but illustrating an alternate form of mold.

The foregoing description of a specific embodiment of a machine for molding servings of ice cream is for the purpose of complying with 35 U. S. C. 112 and we do not desire to be limited to the exact details shown and described for many modifications of the concepts of the invention will be apparent to those skilled in the art. Figures 15–17 illustrate such a modification wherein the apparatus is used for the molding of frozen pork sausage. In this instance the mold is in the form of a cylinder 244. The plunger at the bottom of the cylinder is a piston 245. Preferably the mold 244 has a slight draft; the exact amount of draft will depend upon various factors, although several thousandths normally will be found to be sufficient for pork sausage corresponding to the conventional frozen product. In this instance the sleeve 246 is somewhat longer so as to reach down to the bottom of the mold to commence the filling of the mold from the bottom as previously explained. The associated piston 247 is correspondingly longer.

We claim:

1. The method of forming a frozen product in a mold, said method including the steps of removing heat from the mold to lower the temperature of the mold below freezing, contacting the walls of the cold mold with a water bearing fluid to frost the walls of the mold, filling the mold with said product at a temperature sufficiently low to prevent melting said frost, continuing to remove heat from the mold to freeze the product in the mold, and pushing the frozen product from the mold.

2. The method of forming a frozen product in a mold, said method including the steps of removing heat from the mold to lower the temperature of the mold below freezing, contacting the walls of the cold mold with a water bearing fluid to frost the walls of the mold, filling the mold with said product at a temperature sufficiently low to prevent melting said frost, continuing to remove heat from the mold to freeze the product in the mold, and applying a pressure against one end of the product in the mold tending to push the product from the mold while at the same time applying a rotary force to the product in the mold.

3. The method of forming a frozen product in a mold, said method including the steps of removing heat from the mold to lower the temperature of the mold to below about minus 25 degrees Fahrenheit, contacting the walls of the cold mold with a water bearing fluid to frost the walls of the mold, filling the mold with said product at a temperature sufficiently low to prevent melting said frost while continuing to remove heat from the mold to maintain the temperature of the mold below about minus 25 degrees Fahrenheit, and pushing the frozen product from the mold.

4. The method of forming a frozen product in a mold, said method including the steps of removing heat from the mold to lower the temperature of the mold to below about minus 25 degrees Fahrenheit, filling the mold with said product while continuing to remove heat from the mold to maintain the temperature of the mold below about minus 25 degrees Fahrenheit, and pushing the frozen product from the mold.

5. The method of forming a frozen product in a mold having one open side, said method including the steps of positioning said mold with said open side upwards, removing heat from the mold to lower the temperature of the mold below freezing, contacting the walls of the cold mold with a water bearing fluid to frost the walls of the mold, depositing some of said product at a temperature sufficiently low to prevent melting said frost at the bottom of the mold from a level immediately above the bottom of the mold and continuing to deposit product on top of said previously deposited product from a level immediately above the level of the previously deposited product until said mold is filled, continuing to remove heat from the mold to freeze the product in the mold, and applying pressure to the portion of the frozen product opposite said side in a direction towards said side to push the frozen product from the mold.

6. The method of producing a molded frozen product in a curvilinear mold having one open side, said method including the steps of positioning said mold with said open side upwards, removing heat from the mold to lower the temperature of the mold below freezing, depositing some of said product at the bottom of the mold from a level immediately above the bottom of the mold and continuing to deposit product on top of said previously deposited product from a level immediately above the level of the previously deposited product until said mold is filled, continuing to remove heat from the mold to freeze the product in the mold, and removing the product from the mold by applying pressure to the portion of the frozen product opposite said side in a direction towards said side while at the same time applying force to the product in the mold to loosen and push the frozen product from the mold in a direction tending to rotate the product in the mold.

7. The method of producing a molded frozen product in a curvilinear mold having one open side, said method including the steps of positioning said mold with said open side upwards, removing heat from the mold to lower the temperature of the mold to below about minus 25 degrees Fahrenheit, depositing some of said product at the bottom of the mold from a level immediately above the bottom of the mold and continuing to deposit product on top of said previously deposited product from a level immediately above the level of the previously deposited product until said mold is filled, while continuing to remove heat from the mold to maintain the temperature of the mold below about minus 25 degrees Fahrenheit, and removing the product from the mold by applying pressure to the portion of the frozen product opposite said side in a direction towards said side to push the frozen product from the mold while at the same time applying force to the product in the mold in a direction tending to rotate the product in the mold.

8. The method of producing a molded frozen product in an open ended, curvilinear mold, said method including the steps of removing heat from the mold to lower the temperature of the mold below freezing, filling the mold with said product, continuing to remove heat from the mold to freeze the product in the mold, and removing the product from the mold by applying pressure against the innermost end of the product in the mold tending to push the product outwardly from the mold and at the same time applying force to the product in the mold in a direction tending to rotate the product in the mold.

9. A device for producing a frozen product having a predetermined configuration, said device including conveyor means, a plurality of molds sequentially positioned along said conveyor means for movement thereby along a given path in a given direction, cooling means for said molds, means positioned at a first point along said path to apply vapor to the interior of the molds to frost the interior of said molds, filling means at a second point along said path in said direction from said frosting means to fill said molds with product to be frozen, and ejection means operatively associated with said molds to remove the frozen product from the molds.

10. A device for producing a frozen product having a predetermined configuration, said device including conveyor means, a plurality of molds sequentially positioned along said conveyor means for movement thereby along a given path in a given direction, said molds having one side open with the inner walls of said molds having the general configuration of a figure of revolution, the portion of said mold opposite said one side being separable from the remainder of the mold and being movable toward said one side and about an axis intersecting said side, cooling means for said molds, means positioned at a first point along said path to apply vapor to the interior of the molds to frost the interior of said molds, filling means at a second point along said path in said direction from said frosting means to fill said molds with product to be frozen, and ejection means operatively associated with said molds to move said portion of said molds toward said side and to rotate said portion to remove the frozen product from the molds.

11. A device for producing a frozen product having a predetermined configuration, said device including conveyor means, a plurality of molds sequentially positioned along said conveyor means for movement thereby along a given path in a given direction, said molds having one side open with the inner walls of said molds having the general configuration of a figure of revolution, the portion of said mold opposite said one side being movable toward said one side and about an axis intersecting said side, said portion having a stem extending outside of said molds, cooling means for said molds, means positioned at a first point along said path to apply vapor to the interior of the molds to frost the interior of said molds, filling means at a second point along said path in said direction from said frosting means to fill said molds with product to be frozen, and ejection means operatively associated with said molds, said ejection means including gripping means positioned to one side of said path at a third point in said direction from the other points and adapted to engage said stem, to rotate in a given plane parallel to said side of said mold and to move linearly along a line normal to said plane whereby said portion will be moved toward said side and rotated to remove product from said mold.

12. A device for producing a frozen product having a predetermined configuration, said device including conveyor means, a plurality of molds sequentially positioned along said conveyor means for movement thereby along a given path in a given direction, said molds having one side open with the inner walls of said mold having the general configuration of a figure of revolution, the portion of said mold opposite said one side being separable from the remainder of the mold and being movable toward said one side and about an axis intersecting said side, said portion having a stem extending outside of said molds, cooling means for said molds to maintain the temperature of said molds at a temperature of less than about minus 25 degrees Fahrenheit, frosting means positioned at a first point along said path to direct a blast of water bearing fluid having a temperature higher than that of the temperature of the molds into said molds, filling means at a second point along said path in said direction from said frosting means to fill said molds with product to be frozen, and ejection means operatively associated with said molds, said ejection means including gripping means positioned to one side of said path at a third point in said direction and adapted to engage said stem, to rotate in a given plane parallel to said side of said mold and to move linearly along a line normal to said plane whereby said portion will be moved toward said side and rotated to remove product from said mold.

13. A device for producing a frozen product having a predetermined configuration, said device including conveyor means, a plurality of molds sequentially positioned along said conveyor means for movement thereby along a given path in a given direction, said molds having one side open with the inner walls of said mold having the general configuration of a figure of revolution about an axis, the portion of said mold opposite said one side being separable from the remainder of the mold and being movable toward said one side and about an axis intersecting said side, cooling means for said molds, filling means along said path to fill said molds with product to be frozen, and ejection means operatively associated with said molds to move said portion of said molds toward said side and to rotate said portion about said axis to remove the frozen product from the molds.

14. A device for producing a frozen product having a predetermined configuration, said device including conveyor means, a plurality of molds sequentially positioned along said conveyor means for movement thereby along a given path in a given direction, said molds having one side open with the inner walls of said mold having the general configuration of a figure of revolution, the portion of said mold opposite said one side being separable from the remainder of the mold and being movable toward said one side and about an axis intersecting said side, said portion having a stem extending outside of said molds, cooling means for said molds, filling means at a first point along said path to fill said molds with product to be frozen, and ejection means operatively associated with said molds, said ejection means including gripping means positioned to one side of said path at a second point in said direction from said first point and adapted to engage said stem, to rotate in a given plane parallel to said side of said molds and to move linearly along a line normal to said plane whereby said portion will be moved toward said side and rotated to remove product from said mold.

15. A device for producing a frozen product having a predetermined configuration, said device including conveyor means, a plurality of molds sequentially positioned along said conveyor means for movement thereby along a given path in a given direction, said molds having one side open with the inner walls of said mold having the general configuration of a figure of revolution, the portion of said mold opposite said one side being separable from the remainder of the mold and being movable toward said one side and about an axis intersecting said side, said portion having a stem extending outside of said molds, cooling means for said molds to maintain the temperature of said molds at a temperature of less than about minus 25 degrees Fahrenheit, filling means at a first point along said path to fill said molds with product to be frozen, and ejection means operatively associated with said molds, said ejection means including gripping means positioned to one side of said path at a second point in said direction from said first point and adapted to engage said stem, to rotate in a given plane parallel to said side of said molds and to move linearly along a line normal to said plane whereby said portion will be moved toward said side and rotated to remove product from said mold.

16. A device for producing units of product having a predetermined configuration, said device including conveyor means, a plurality of molds arranged in rows with the rows positioned sequentially along said conveyor means for movement thereby along a given path in a given direction, said molds having an open side and being attached to said conveyor in a position such that said open sides are upwardly along a portion of said path, the molds in each row being regularly spaced, filling means at a first point along said portion of said path to insert product to be formed in said molds, ejection means operatively associated with said molds at a second point along said portion of said path in said direction from said first point to raise the formed product from the molds, and transfer means positioned above said molds at said second point to grasp each formed unit of product in a row and to move the row to a line beyond the conveyor while moving the units in a row together so that each unit is positioned immediately adjacent the other and to release said row of units after they have been moved to said line beyond said conveyor.

17. A device for producing units of products having a predetermined configuration, said device including conveyor means, a plurality of molds arranged in rows with the rows positioned sequentially along said conveyor means for movement thereby along a given path in a given direction, said molds having an open side and being attached to said conveyor in a position such that said open sides are upwardly along a portion of said path, the molds in each row being regularly spaced, said molds having an inner wall of the general configuration of a figure of revolution, the portion of the inner wall opposite said one side being movable toward said one side and about an axis intersecting said side, filling means at a first point along said portion of said path to insert product to be formed in said molds, ejection means operatively associated with said molds at a second point along said portion of said path in said direction from said first point to rotate said portion of said molds and to move said portion toward said side to raise the formed product from the molds, and transfer means positioned above said molds at said second point to grasp each formed unit of product in a row after the units are raised from the molds and to move the row to a line beyond the conveyor while moving the units in a row together so that each unit is positioned immediately adjacent the other and to release said row of units after they have been moved to said line beyond said conveyor.

18. A device for producing units of product having a predetermined configuration, said device including conveyor means, a plurality of molds arranged in rows with the rows positioned sequentially along said conveyor means for movement thereby along a given path in a given direction, said molds having an open side and being attached to said conveyor in a position such that said open sides are upwardly along a portion of said path, the molds in each row being regularly spaced, filling means at a first point along said portion of said path to insert product to be formed in said molds, ejection means operatively associated with said molds at a second point along said portion of said path in said direction from said first point to raise the formed product from the molds and transfer means positioned above said molds at said second point, said transfer means including a pair of depending fingers for each of the molds in a row, means to move said fingers along a way from a first line to a second line, means to position each pair of fingers over a mold when said fingers are in the first line, said last mentioned means being adapted to move the pairs of fingers closer together when the fingers are positioned in said second line, and means to close said fingers about said raised product when the fingers are in said first line and to open said fingers to release said product when the fingers are in said second line.

19. A device for producing units of product having a predetermined configuration, said device including conveyor means, a plurality of molds arranged in rows with the rows positioned sequentially along said conveyor means for movement thereby along a given path in a given direction, said molds having an open side and being attached to said conveyor in a position such that said open sides are upwardly along a portion of said path, the molds in each row being regularly spaced, cooling means for said molds, frosting means positioned at a first point along said path to frost the interior of said molds, filling means at a second point along said portion of said path in said direction from said first point to insert product to be formed in said molds, ejection means operatively associated with said molds at a third point along said portion of said path in said direction from said second point to raise the formed product from the molds, and transfer means positioned above said molds at said third point to grasp each formed unit of product in a row and to move the row to a line beyond the conveyor while moving the units in a row together so that each unit is positioned immediately adjacent the other and to release said row of units after they have been moved to said line beyond said conveyor.

20. A device for producing a frozen product having a predetermined configuration, said device including conveyor means, a plurality of molds sequentially positioned along said conveyor means for movement thereby along a given path in a given direction, said molds having one side open with the inner walls of said mold having the general configuration of a figure of revolution about an axis, the portion of said mold opposite said one side being separable from the remainder of the mold and being movable toward said one side and about an axis intersecting said side, cooling means for said molds, filling means along said path to fill said molds with product to be frozen, said filling means including a filling spout and mounting means to move said spout through said side into a mold when the mold is to be filled with the end of the spout immediately adjacent said portion of said mold and to gradually raise the end of said spout as said mold is filled with product, and ejection means operatively associated with said molds to move said portion of said molds toward said side and to rotate said portion about said axis to remove the frozen product from the molds.

21. A device for producing units of product having a pretermined configuration, said device including conveyor means, a plurality of molds arranged in rows with the rows positioned sequentially along said conveyor means for movement thereby along a given path in a given direction, said molds having an open side and being attached to said conveyor in a position such that said open sides are upwardly along a portion of said path, the molds in each row being regularly spaced, cooling means for said mold, frosting means positioned at a first point along said path to frost the interior of said molds, filling means at a second point along said portion of said path in said direction from said first point to insert product to be formed in said molds, said filling means including a filling spout for each of the molds in a row and mounting means to move said spouts through the open sides of said molds when the molds are to be filled with the open ends of the spouts immediately adjacent said portions of said molds and to gradually raise the ends of said spouts as said molds are filled with product, ejection means operatively associated with said molds at a third point along said portion of said path in said direction from said second point to raise the formed product from the molds, and transfer means positioned above said molds at said third point to grasp each formed unit of product in a row and to move the row to a line beyond the conveyor while moving the units in a row together so that each unit is positioned immediately adjacent the other and to release said row of units after they have been moved to said line beyond said conveyor.

22. A device for producing a frozen product having a predetermined configuration, said device including conveyor means, a plurality of molds sequentially positioned along said conveyor means for movement thereby along a given path in a given direction, cooling means for said molds, filling means at a second point along said path to fill said molds with product to be frozen, said filling means including a product cylinder, a piston for said cylinder, valve means for said cylinder and mounting means for said piston and cylinder, said mounting means being adapted to move said cylinders into said molds from the top of the molds with the end of the cylinder immediately adjacent the bottom side of the mold, to move the piston into the cylinder to eject the contents of the cylinder into the mold while at the same time gradually withdrawing the cylinder from the mold, and to subsequently withdraw both the cylinder and piston from the mold, and ejection means operatively associated with said molds to remove the frozen product from the molds.

23. A device for molding and chilling a product, said device including a mold having one side open, the inner walls of said mold having the general configuration of a figure of revolution about an axis, means to cool said mold, the portion of said mold opposite said one side being separable from the remainder of the mold and being movable both toward said side and about an axis intersecting said side, and means to move said portion toward said side and to rotate said portion about said axis.

24. A device for molding and chilling a product, said device including a mold having one side open, the inner walls of said mold having the general configuration of a figure of revolution, means to cool said mold, the portion of said mold opposite said one side being separable from the remainder of the mold and being movable both toward said side and about an axis intersecting said side, said portion having a stem extending outside of said mold, and power actuated means having gripping means to engage said stem and adapted to rotate in a given plane and to move linearly along a line normal to said plane, said power actuated means being positioned with said plane parallel to said one side and with said line parallel to and engaging said stem whereby said portion will be moved toward said side and rotated to remove product from said mold.

25. The method of removing a formed frozen product from an open ended curvilinear mold, comprising the step of pressing and turning the innermost end of the product outwardly from within the inner end of the mold and relative thereto.

References Cited in the file of this patent

UNITED STATES PATENTS

| | | |
|---|---|---|
| 2,071,465 | Huber | Feb. 23, 1937 |
| 2,334,052 | Wedin | Nov. 9, 1943 |
| 2,431,916 | Caesar | Dec. 2, 1947 |